Feb. 1, 1927.
W J. HEPPERLE
1,616,418
DIVERTING AND DISTRIBUTING MECHANISM FOR CARRIER SYSTEMS
Filed March 24, 1926   3 Sheets-Sheet 1

Inventor
William J. Hepperle
by Roberts, Cushman & Woodberry
Att'ys.

Feb. 1, 1927.
W J. HEPPERLE
1,616,418
DIVERTING AND DISTRIBUTING MECHANISM FOR CARRIER SYSTEMS
Filed March 24, 1926
3 Sheets-Sheet 2
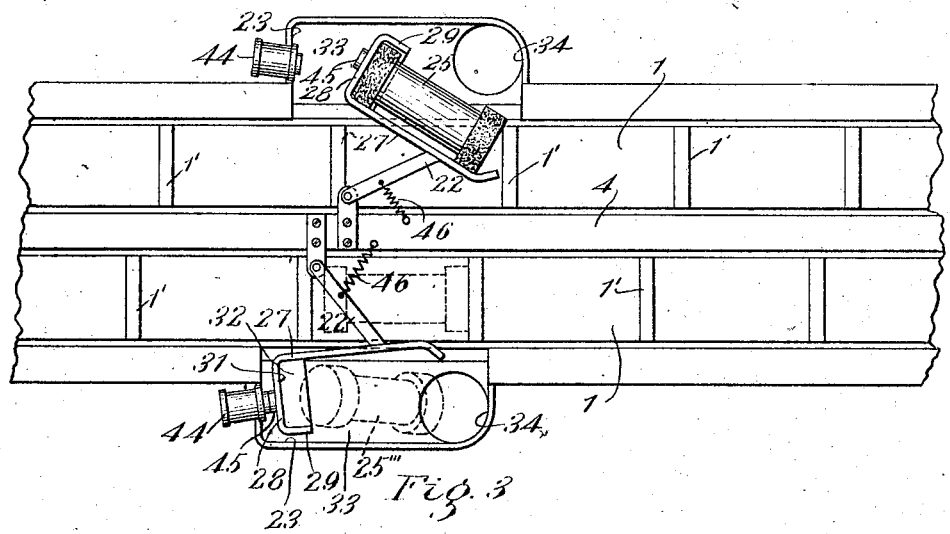
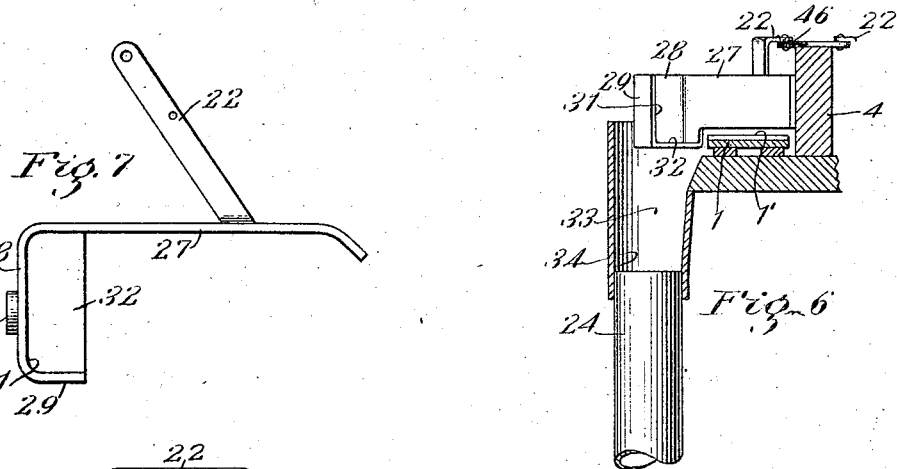
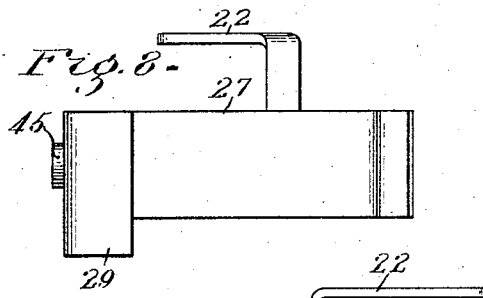
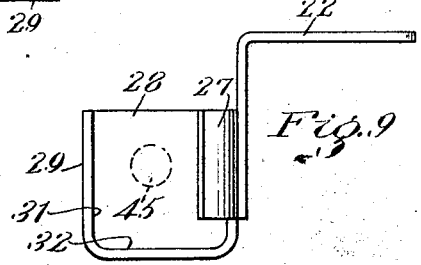
Inventor
William J. Hepperle
by Roberts Cushman & Woodberry
Att'ys.

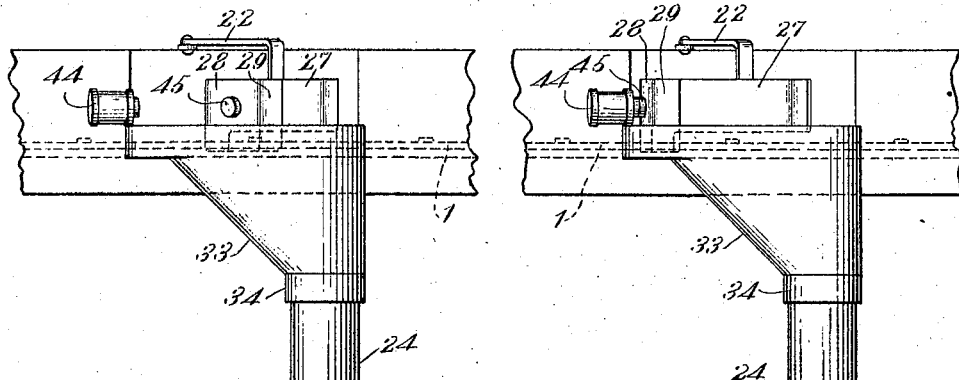
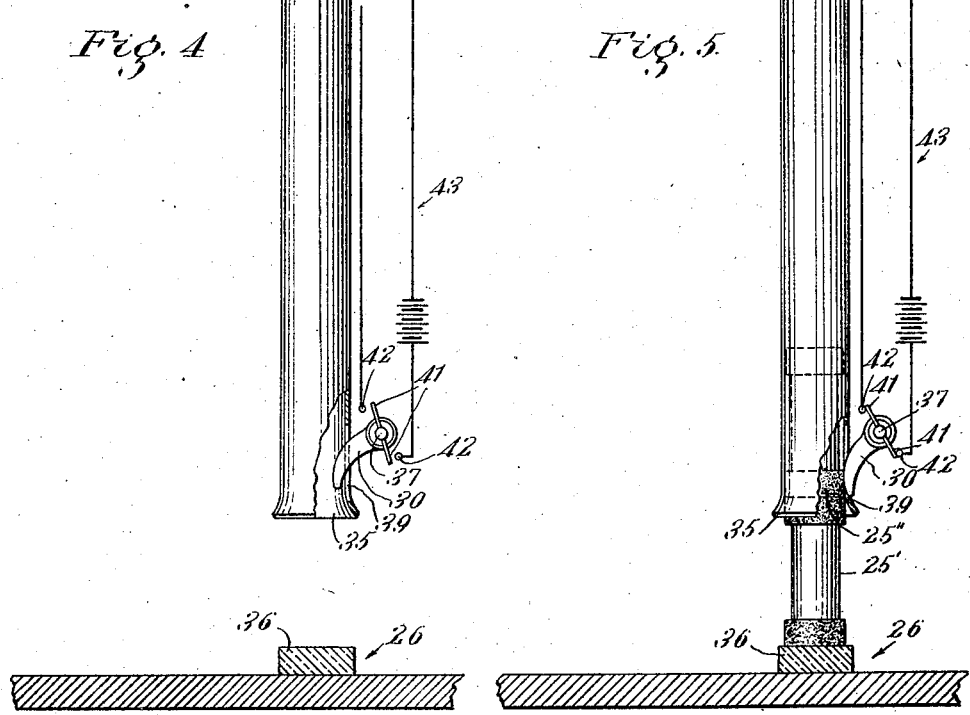

Patented Feb. 1, 1927.

1,616,418

UNITED STATES PATENT OFFICE.

WILLIAM J. HEPPERLE, OF SYRACUSE, NEW YORK, ASSIGNOR TO THE LAMSON COMPANY, OF SYRACUSE, NEW YORK, A CORPORATION OF MASSACHUSETTS.

DIVERTING AND DISTRIBUTING MECHANISM FOR CARRIER SYSTEMS.

Application filed March 24, 1926. Serial No. 96,985.

This invention relates to carrier systems and the like, and more especially to systems for selectively and automatically diverting and distributing carriers from a main course into a plurality of terminal stations.

The invention comprehends in general an apparatus for the delivery of carriers (coming from various points and in more or less variable numbers) to a common conveyor, and for selectively diverting and distributing or apportioning such carriers from the conveyor among two or more different terminal stations, more or less according to the several rates at which they are attended to and removed from the stations. A separate and independent system may be employed for returning the carriers to their respective points of origin.

One purpose, for which the invention is especially appropriate, consists in the delivery of cash carriers from the salespeople in the various departments of a retail store to the cashiers, for making change, recording sales and the like, the carrier being then returned to the salesman from whom it was received. In such systems, where a number of cashiers are required, it becomes essential that the carriers be apportioned among them as rapidly as possible, that is, without oversupplying some with more carriers than they can attend to and also without leaving any one cashier without carriers as long as there are any incoming carriers to be distributed.

A typical embodiment of the invention, as arranged and adapted to serve this purpose, is shown by the accompanying drawings, in which:—

Fig. 3 is a view similar to Fig. 2 showing carriers in position for operating the distributors;

Fig. 4 is a side elevation of a distributor and terminal station when empty;

Fig. 5 is a side elevation similar to Fig. 4 showing two carriers therein;

Fig. 6 is a detailed cross-section of the upper portion or receiving end of the terminal station and conveyor;

Fig. 7 is a plan view of the diverting element of the distributor;

Fig. 8 is a side view of the diverting element of the distributor; and

Fig. 9 is an end view of the diverting element of the distributor.

Figure 1:
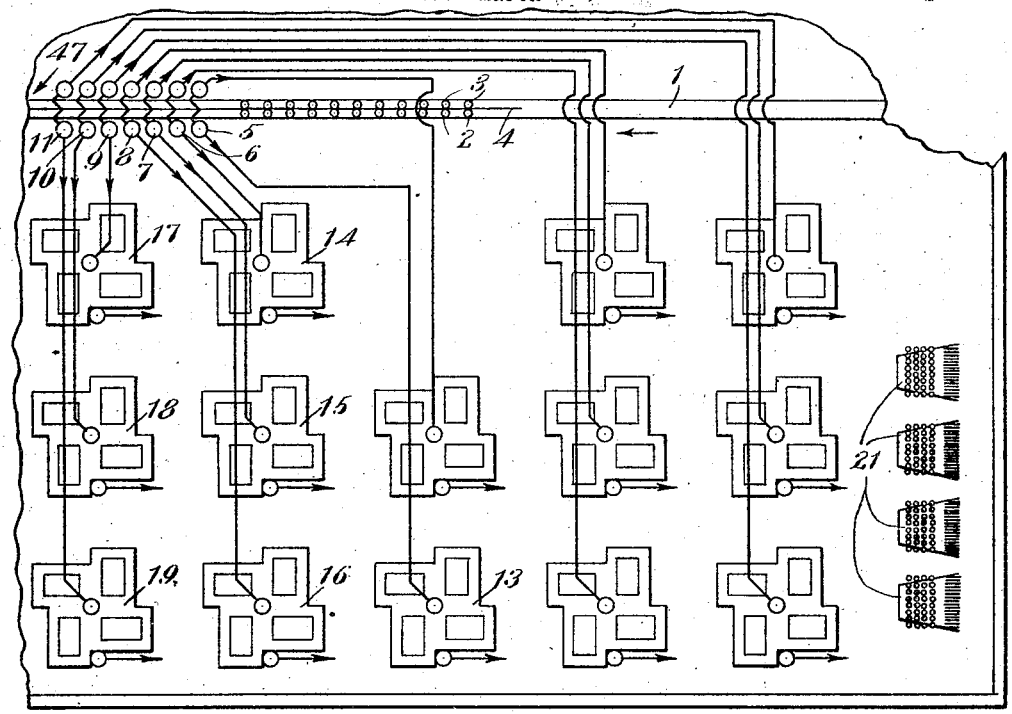
Fig. 1 is a diagrammatic plan of the receiving and distributing system as a whole.

Referring to Fig. 1, there is diagrammatically illustrated a general carrier and distributing system of which the present invention forms a principal part. The horizontal conveyor 1, travelling in the direction of the arrow, is adapted to receive carriers from two rows of tubes 2 and 3 which are conveniently positioned above the conveyor to discharge carriers thereon. The carriers thus deposited upon the belt 1 are separated by a longitudinal partition 4. Beyond the openings of the discharge tubes 2, 3, and located alongside the conveyors, are provided distributor devices 5, 6, 7, 8, 9, 10, 11 connected with cashiers' desks 13, 14, 15, 16, 17, 18, 19 respectively through corresponding conduits as indicated by arrows. A second row of distributors similar to the first may be provided along the rear side of the conveyor, to handle carriers from the delivery tubes 3, with like conduits leading therefrom to terminals at the several cashiers' desks corresponding thereto, as will be clear from the drawing. Each cashier's desk may be provided with a tube (as indicated by arrows) leading to the despatchers' desks 21 from which the carrier may be returned to the person originally sending it, for which well-known means are of general knowledge and commonly used.

Figure 2:
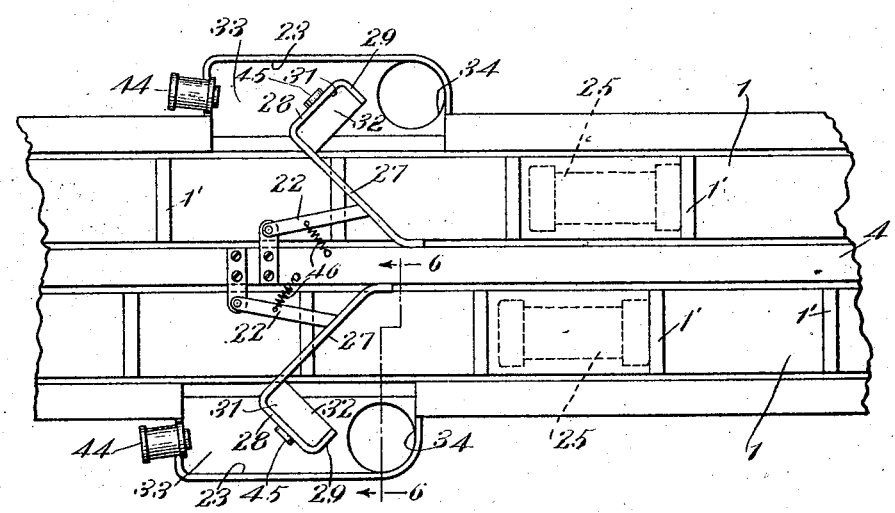
Fig. 2 is a detail plan view of the main conveyor belt and a pair of distributors associated therewith.

On either side of partition 4, and above the conveyor belt 1 a distributor device is provided (Fig. 2) such as distributor 5 of Fig. 1, comprising generally a horizontal diverting arm 22, pivoted over the conveyor belt and adapted to catch a carrier 25 moving thereon and to swing into a receiving chamber 23 which in turn opens into a vertical or other suitably disposed conduit 24 (Figs. 4 and 5) terminating at a station 26, from which the carriers 25′, 25″ may be removed.

The arm 22 is pivoted so that it swings at a sufficient height above the conveyor belt to permit carriers 25 to pass thereunder when in open position, as shown in the lower part of Fig. 3. Affixed to the outer end of arm 22 is a depending deflector plate 27 disposed at such an angle thereto as to stand transversely across the path of carriers on the conveyor belt when in closed position (Fig. 2) and to stand parallel with and beyond such path when the arm is swung into open position shown in Fig. 3. The rearward end of deflector plate 27 is bent outwardly at 28 and again at 29, substantially into parallelism with plate 6 and forming a recess or pocket 31 therewith. A shelf-like projection 32 extends from the lower edge of the deflector plate forming a bottom to the pocket 31 at a level slightly below that of the conveyor belt. (Figs. 6-9).

The receiving chamber 23 opens out of the path of the conveyor belt at a point opposite the arm 22 and is of sufficient size to receive the deflector plate, with a carrier 25 in the pocket 31 thereof. Chamber 23 is preferably provided with a sloping bottom 33 terminating in an opening 34 leading to the vertical conduit 24, which is of such diameter as to receive the carrier 25' longitudinally therein and has a terminal opening 35 at a sufficient distance above a stop member 36 to retain the upper end of the carrier and prevent it from falling out of the tube, and at the same time to permit of withdrawing it laterally therefrom.

Adjacent the lower or terminal end of the tube 24 the lever arm 30 of a switch 37, which is let in through opening 39 in the side wall of the tube and has contact points 41 adapted to make connection between points 42 in an electric circuit 43 leading through a solenoid 44 positioned in the rear end of the receiving chamber 23. A button 45 of magnetic material such as iron is fixed to member 28 of the deflector element, adapted to engage and be retained by the magnetic attraction of the solenoid, when the deflector is in retracted position and when the solenoid is activated by the passage of an electric current therethrough. A spring 46 is also provided upon the deflector arm tending to return the same to closed position across the conveyor when released by the cutting off of the current through the solenoid.

In operation a carrier 25 conveyed in the direction of the arrow upon the belt 1 (Figs. 1 and 2) will strike the deflector plate of the distributor device, and be diverted thereby, under the effect of its own momentum, into a position oblique to the path of the conveyor, the forward end sliding forwardly and entering the pocket 31 formed in the end of the plate. The momentum of its impact and continued urge by the ribs 1', 1' upon the conveyor belt against the rear end of the carriers, swings the deflector and carrier first into the position shown in the upper part of Fig. 3. Thereupon the carrier is swung into the receiving chamber 23. The forward end of the carrier is supported by the shelf-like member 32 of the deflector, but the rear end of the carrier having now left the support of the conveyor belt drops downwardly (as indicated in the lower portion of Fig. 3) and, directed by the sloping bottom 33, falls through the vertical tube 24 to the position 25', shown in Fig. 5.

The arm 22, actuated by the spring, swings back into closed position with the deflector again standing obliquely across the belt. A second carrier 25'' on the conveyor belt may be similarly caught, diverted and dropped to the terminal station in substantially the same manner as the first. However, the second carrier will rest upon the first (if the first has not been previously removed) as in Fig. 5. In such position the carrier 25'' will engage and turn the lever arm of the switch 37, thereby closing the circuit 43 through contact points 41 and 42 and actuating the solenoid 44.

As a third carrier 25''' on the conveyor belt now strikes the deflector (which has meanwhile again returned to closed position, under the action of spring 46, when the carrier leaves the receiving chamber 23) the magnetic plug 45 thereon, upon approaching or striking the solenoid 44, is retained within the receiving chamber, or open position, even after the carrier has dropped into the vertical tube of the terminal station. Subsequent carriers upon the belt 1 are now permitted to continue past the deflector, passing beneath the arm 22, until they come to the next deflector plate which is in closed position, which may be e. g., any one of the series 6, 7, 8, 9, 10, 11 successively. The series obviously may be so extended as to provide for all of the carriers likely to be deposited upon the conveyor belt, but in cases of emergency or temporary overflow, the conveyor may deliver any excess carriers to a terminal station 47, without control of the number so delivered.

When carrier 25' is withdrawn from the terminal of tube 3, the next carrier 25'' will fall down and take its place. In the case of the station containing three carriers, the third 25''' will fall to take the place of the second and still retain the switch 37 in closed position. Upon reducing the number of carriers to one, however, the switch opens as shown in Fig. 4 thus breaking the electric circuit through the solenoid and releasing the deflector arm to return again to closed position, ready for the reception of the next carrier upon the conveyor belt.

In this manner each station is continuously provided with one or more carriers, so long as there is a supply of carriers on the conveyor, but not, at any one time, with more than three. If it be desired to permit four or more carriers to be delivered to a station, before leaving its deflector in open position and allowing carriers to go on to the next station, this may be effected by suitably adjusting the position at which the lever arm 30 of the regulating switch stands in the tube 24. Alternatively, this arm may be lowered to permit but one or two carriers to enter the terminal station at one time.

I claim:

1. A carrier system comprising a conveyor, a plurality of terminal stations along the path of said conveyor, distributors corresponding to said terminal stations and having deflector elements adapted normally to engage and divert carriers from said conveyor into said terminal stations, and means constructed and arranged to render any given deflector element inoperative so long as a predetermined number of carriers are contained in the corresponding station.

2. A carrier system comprising a conveyor, terminal stations along the path of travel of said conveyor, a receiving chamber opening from the path of said conveyor and leading to each of said terminal stations, a distributor having a deflector arm adapted normally to stand in said path and to swing under impact of a carrier on said conveyor into said receiving chamber, and means in the terminal station operative to retain said deflector arm in the receiver chamber when a predetermined number of carriers stand in the corresponding station.

3. A carrier system comprising a horizontal conveyor, a carrier-receiving chamber opening into the path of travel of said conveyor and leading to a corresponding terminal station, and a pivoted deflector opposite said chamber, normally standing obliquely to said path, and adapted to receive a carrier and swing horizontally in the direction of travel of said conveyor into the receiving chamber.

4. A carrier system comprising a horizontal conveyor, a plurality of carrier-receiving chambers opening into the path of travel of said conveyor and leading severally to corresponding terminal stations, and a pivoted deflector opposite each such chamber, normally standing in said path and adapted to engage a carrier and swing horizontally therewith, in the direction of travel of said conveyor, into the receiving chamber.

5. A carrier system comprising a horizontal conveyor, a carrier-receiving chamber opening into the path of travel of said conveyor, a pivoted deflector, normally standing in and obliquely to said path, a pocket in the deflector adapted to receive a carrier and swing in the direction of travel of said conveyor into the receiving chamber, and a sloping bottom and outlet conduit in said chamber leading to a terminal station.

6. A carrier system comprising a horizontal conveyor, a plurality of carrier-receiving chambers opening into the path of travel of said conveyor, a pivoted deflector standing opposite each chamber and obliquely across said path, having a pocket therein adapted to receive a carrier and to swing in the direction of travel of said conveyor into the receiving chamber, said chamber having a sloping bottom and outlet conduit leading to a corresponding terminal station.

7. A carrier system comprising a horizontal conveyor, a carrier receiving chamber opening into the path of travel of said conveyor, a pivoted arm, a deflector plate on the arm normally standing in and obliquely to said path, a pocket in the deflector plate having a bottom at a slightly lower level than that of the horizontal conveyor, partially to receive and support a carrier therein, said deflector being adapted to swing in the direction of travel of the conveyor into the receiving chamber, and a sloping bottom and outlet conduit from said chamber leading to a terminal station.

8. A carrier system comprising a horizontal conveyor, a plurality of carrier-receiving chambers, each chamber opening into the path of travel of said conveyor, a pivoted deflector plate normally standing in and obliquely to said path, adapted to receive a carrier and to swing, in the direction of travel of said conveyor, into the receiving chamber, a sloping bottom and outlet conduit to said chamber leading to a terminal station, an electric switch in the terminal station, means to form a closed electric circuit by engagement with carriers standing therein, and a solenoid in the receiving chamber positioned to register with the deflector plate to retain the same in inoperative position when actuated by the passage of an electric current therethrough.

9. A carrier distributing system comprising a conveyor belt for bearing carriers along a substantially horizontal path, an arm pivoted to swing horizontally above the carriers moving along the path, a deflector plate depending from the end of said arm and swinging therewith into the path of said carriers at an oblique angle, and a pocket on the rearward end of said plate, the lower portion of said pocket standing below and beyond the level of said conveyor belt and adapted to receive the end of a carrier therein.

10. A carrier system comprising a main conveyor or the like for the conveyance of carriers, a terminal station alongside said conveyor, a pivoted deflector adapted to swing above carriers on the conveyor, and a plate on the deflector adapted to engage carriers passing along the path of the conveyor and to swing with the same out of said path and above said terminal station.

11. A carrier system comprising a main conveyor for carriers, a terminal station at one side thereof, a pivoted arm normally disposed above said conveyor and adapted to swing over said terminal station under impact of a carrier thereagainst.

12. A carrier system comprising a main conveyor for conducting carriers along a horizontal path, a terminal station having a receiver for said carriers, alongside the conveyor, a pivoted horizontal catching arm normally standing in said path, and a shelf thereon shaped to catch an oncoming carrier, said arm being free to swing into said receiver under impact of a carrier thereagainst.

13. A system comprising a horizontal conveyor for carriers or the like comprising a terminal station having a receiving chamber alongside the path of said carrier, an arm pivoted to swing horizontally above the carriers in said path and into said receiver station in the direction of movement of the conveyor, and an open pocket on the arm, angularly positioned with respect to the arm to stand obliquely with the path of movement when over the conveyor and parallel to the path of movement when positioned in the receiver chamber, and adapted to engage and partly support a carrier.

Signed by me at Syracuse, N. Y. this 8th day of March, 1926.

WILLIAM J. HEPPERLE.